US008498545B2

(12) United States Patent
Becouarn et al.

(10) Patent No.: US 8,498,545 B2
(45) Date of Patent: Jul. 30, 2013

(54) DPSK DEMODULATOR AND DEMODULATING METHOD

(75) Inventors: Loïc Becouarn, Paris (FR); Georges Grandpierre, Arpajon (FR); Thierry Boissau, Voisins le Bretonneux (FR)

(73) Assignee: Alcatel Lucent, Paris (FR)

( * ) Notice: Subject to any disclaimer, the term of this patent is extended or adjusted under 35 U.S.C. 154(b) by 2038 days.

(21) Appl. No.: 11/312,741

(22) Filed: Dec. 21, 2005

(65) Prior Publication Data

US 2006/0133827 A1    Jun. 22, 2006

(30) Foreign Application Priority Data

Dec. 22, 2004 (EP) ..................................... 04293100

(51) Int. Cl.
*H04B 10/06* (2006.01)
(52) U.S. Cl.
USPC .......................................................... 398/213
(58) Field of Classification Search
USPC ..................... 398/202, 208–211; 359/325
See application file for complete search history.

(56) References Cited

U.S. PATENT DOCUMENTS

| 5,359,412 | A | 10/1994 | Schulz | |
|---|---|---|---|---|
| 6,396,605 | B1 | 5/2002 | Heflinger | |
| 6,469,817 | B1 * | 10/2002 | Heflinger | 398/202 |
| 7,233,399 | B2 * | 6/2007 | Schlenk et al. | 356/477 |
| 2005/0213990 | A1 * | 9/2005 | Watanabe | 398/177 |
| 2007/0274731 | A1 * | 11/2007 | Boffi et al. | 398/188 |

FOREIGN PATENT DOCUMENTS

| EP | 0 967 743 A2 | 12/1999 |
|---|---|---|
| WO | WO 03/063515 A2 | 7/2003 |

OTHER PUBLICATIONS

Henry Dutton, 'Understanding Optical Communications', IBM International Technical Support Organization, Sep. 1998.*
John H. Scofield, 'Frequency-domain description of a lock-in amplifier', American Journal of Physics vol. 62, No. 2, Feb. 1994.*
E. Swanson e al., "High Sensitivity Optically Preamplified Direct Detection DPSK Receiver with Active Delay-Line Stabilization", IEEE Photonics Technology Letters, vol. 6, No. 2, Feb. 1994.*
A. Swanson et al, High Sensitivity Optically Preamplified Direct Detection DPSK Receiver with Active Delay-Line Stabilization, IEEE Photonics Technology Letters, IEEE, Inc., New York <US, vol. 6, No. 2, Feb. 1, 1994, pp. 263-265, XP000439768.

* cited by examiner

*Primary Examiner* — Shi K Li
(74) *Attorney, Agent, or Firm* — Sughrue Mion, PLLC

(57) ABSTRACT

A demodulator for a DPSK-modulated optical signal of bit frequency 1/T, comprises an interferometric structure (3) having an input port (1) for receiving the DPSK-modulated optical signal, an output port (8), and first and second arms (4, 5) extending from said input port (1) to said output port (8), adjustment means (5, 7, 14, 16) for fine tuning a propagation delay difference of said two arms (4, 5) in a range comprising T, an optical/electrical converter (10) connected to the output port (8) of the interferometric structure (3), and a bandpass filter (12) connected to an output of the optical/electrical converter (10), the passband of which does not include 1/T. The adjustment means (5, 7, 14, 16) is adapted to tune the propagation delay according to the output power level of the bandpass filter (12).

9 Claims, 3 Drawing Sheets

DPSK DEMODULATOR AND DEMODULATING METHOD

The present invention relates to a demodulator and to a method for demodulating a DPSK (Differential Phase Shift Keyed) optical communication signal. In DPSK transmission it is necessary to perform a phase-amplitude conversion at the receiver using a delay interferometer. In order to achieve a demodulation at a high signal-noise ratio the delay difference between the two arms of such an interferometer must fulfill two conditions. Firstly, the delay must be equal to an integer multiple of the bit time of the communication signal, so that during the entire duration of a bit, it interferes only with a single other bit but never with itself. Secondly, the optical phase delay difference must in be an integer multiple of pi for the optical carrier signal, in order for the interfering light waves to be either exactly in phase or in phase opposition. Since in solid-state applications the index of refraction of the material through which light propagates in the interferometer is temperature dependent, temperature fluctuations of the interferometer may cause a detuning of the interferometer which affects the extinction ratio between ones and zeroes also called "eye opening". Therefore, in K-Shimomura et al. "A performance stabilized 40 Gb/s CS-RZ DPSK transponder for transoceanic WDM transmission systems" (proceedings ECOC '03 paper Tu4.6.6) discloses a demodulator in which the interferometer is temperature stabilised using a thermoelectric cooler.

Such a demodulator is insensitive to variations of the ambient temperature, but it is not capable of compensating a wavelength fluctuation of the optical communication signal itself. Therefore, even if the temperature of the interferometer is perfectly stabilized, a wavelength drift of the optical communication signal can cause a significant decrease of the eye opening at the receiver side.

The object of the invention is to provide a demodulator and a method for demodulating a DPSK-modulated optical signal by which a high eye opening can be maintained even in case of fluctuations of the wavelength of the optical signal.

In a demodulator for a DPSK-modulated optical signal of bit frequency 1/T which comprises an interferometric structure having an input port for receiving the DPSK-modulated optical signal, an output port and first and second arms extending from said input port to said output port, adjustment means for fine-tuning a propagation delay difference of said two arms in a range comprising T, and an optical/electrical converter connected to the output port of the interferometic structure, this object is achieved by a bandpass filter which is connected to an output of the optical/electrical converter, the passband of which does not include 1/T, and by the fact that the adjustment means is adapted to tune the propagation delay according to the output power level of the bandpass filter.

The object is also achieved by a method for demodulating a DPSK modulated optical signal of bit frequency 1/T, in which
the DPSK modulated optical signal is split in first and second fractions,
first and second delays are applied to the first and second fractions, respectively, the delays differing by approximately T, so as to obtain an intensity-modulated optical signal,
the intensity-modulated optical is converted signal into an electrical signal,
the power of a band of the electrical signal is determined, the band not including the frequencies 0 and 1/T, and
based on the determined power, it is decided whether the delay is modified.

An investigation of simulated power spectra at the output of the optical/electrical converter has shown that while the spectral components at frequencies 0 and 1/T hardly vary when the interferometer is detuned with respect to the carrier frequency of the optical signal, there are frequency ranges above 1/T and between 0 and 1/T where the signal power decreases noticeably and monotonically with increasing frequency mismatch, so that by measuring the signal power in this frequency range, information about the amount of frequency mismatch can be obtained.

Simulation results show that there is a power decrease with increasing frequency mismatch in frequency bands both below and above the bit frequency of 1/T. Preferably, the passband is selected with a lower cutoff frequency above 0 and an upper cutoff frequency below 1/T, because the power level of the filter output signal in this frequency range is easier to measure than at a frequency above 1/T.

The adjustment means preferably comprises an optical element located in one of the arms of the interferometric structure, the delay of which is variable according to a control signal supplied to the optical element, and a control circuit for deriving the control signal from the output power level of the bandpass filter.

The optical element of the demodulator preferably comprises a piece of material, the index of refraction which is variable with temperature, and a heater and/or cooler for heating or cooling said piece of material with an amount of heating/cooling power defined by the control signal, so that the optical element can be adjusted by controlling its temperature.

Alternatively, the optical element might comprise a piece of material exhibiting the electro-optical or magneto-optical effect, i.e. the index of refraction of which is variable with a strength of an electric or magnetic field applied to it, and field generating means for generating the field with a strength defined by the control signal.

In order to detect not only whether the interferometric structure is detuned or not, but also in which direction the index of refraction of said piece of material of the optical element must be modified in order to improve the tuning, the control means preferably comprises dithering means for dithering the control signal and is adapted to vary the average level of the control signal based on a phase relationship between the dithering of the control signal and a fluctuation of the output power level of the bandpass filter.

If the heater is an ohmic heater, the heating power is proportional to the square of the current intensity or voltage applied to the heater. In order to make the dithering amplitude of the heating power independent from the average value of the heating power, a dithering amplitude of a current or voltage applied to the heater should be inversely proportional to the average level of the current or voltage.

Further features and advantages of the invention will become apparent from the subsequent description of embodiments thereof referring to the appended drawings.

Figure 1:
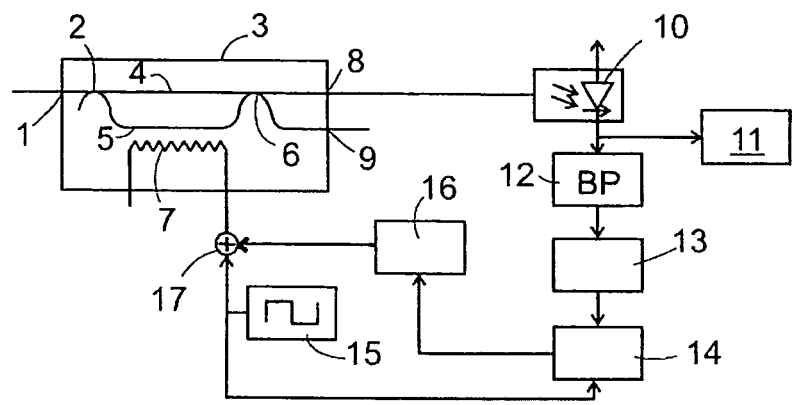
FIG. 1 is a block diagram of a demodulator according to the invention.

FIG. 1 is a block diagram of a demodulator according to the invention. An input port 1 of the demodulator receives an optical NRZ-DPSK signal of bit time T. The input port 1 is connected to a power splitter 2 of a Mach-Zehnder interferometer (MZ interferometer) 3. The power splitter 2 splits the incoming signal into two fractions of identical power levels and supplies them to two optical fibres 4, 5 which form two arms of the MZ interferometer 3 and extend from input side power splitter 2 to an output side directional coupler 6. At the directional coupler 6, the two fractions interfere. The propagation delays of the DPSK signal in the two arms 4, 5 differ by one bit time T of the DPSK signal, so that when the two fractions of the DPSK signal propagating along the arms 4, 5 meet at coupler 6, successive bits interfere.

A heating device 7, e.g. an ohmic resistor or a thermoelectric device, is provided for controlling the optical phase delay of arm 5 by means of its temperature. Since the refractive index of the fibre from which arms 4 and 5 are formed is slightly temperature dependent, the heater 7 allows a fine-tuning of the delay difference between arms 4 and 5 in the range of an oscillation period of the optical carrier wave of the DPSK signal, so that the phase relationship between the two fractions of the DPSK signal which interfere in directional coupler 6 can be controlled precisely.

The interferometer 3 has two outputs, referred to as constructive or destructive output port, respectively. If two bits of identical phase interfere at coupler 6, a positive intensity is output at constructive port 8, and zero intensity at destructive port 9, whereas in case of bits of opposite phase interfering, a positive intensity is output at destructive port 9 and zero intensity at constructive port 8.

A photodiode 10 is connected to constructive output port 8 for converting the optical output signal from interferometer 3 into an electric signal.

The time resolution of the photodiode 10 is sufficient to resolve individual bits of the optical signal it receives, and it has conventional data regeneration circuitry 11, not explained in detail here, connected to its output. Further, there is a bandpass filter 12 connected to the output of photodiode 10, the passband of which is located between 0 and the bit frequency 1/T of the optical signal and includes neither of these two frequencies. An envelope detection circuit 13 is connected to the output of bandpass filter 12 in order to provide an output signal representative of the electrical power output by bandpass filter 12. The power output signal from circuit 13 is supplied to a phase comparator 14 for extracting from it a spectral component at the frequency of a local oscillation signal supplied from a local oscillator 15 and detecting a phase difference between said component and the local oscillator signal. A phase difference signal thus obtained by phase comparator 14 is supplied to a heater control circuit 16. The heater control circuit 16 provides an output signal representative of a desired heating power of heater 7 to an adding circuit 17, which adds to it the oscillating signal from local oscillator 15 and supplies it as a driving signal to heater 7.

The temperature of interferometer arm 5 thus oscillates at the local oscillator frequency and with a small amplitude about an average temperature defined by the output level of heater control circuit 16.

Figure 2:
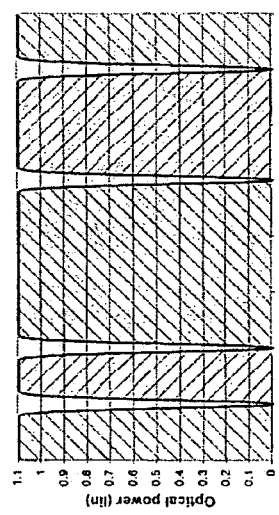
FIG. 2 is an example of a bit sequence in a DPSK modulated signal.
Figure 3:
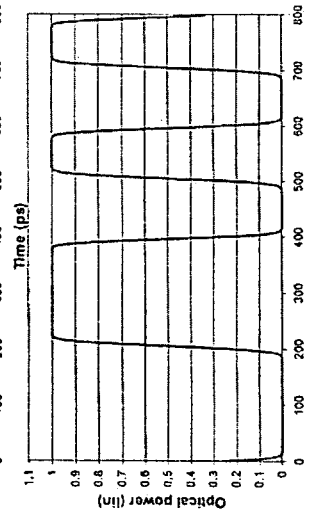
FIG. 3 is an intensity modulated signal obtained from the DPSK signal of FIG. 2 at a constructive interferometer output port in the demodulator of FIG. 1 if the interferometer is perfectly tuned to the optical carrier frequency.

The operation of the assembly of FIG. 1 is explained in detail referring to FIGS. 2-6. FIG. 2 is an example of a DPSK signal received at input port 1. The signal has a bit frequency of 10 Gb/s, i.e. the bit time T corresponds to 100 ps. The solid curve in FIG. 2 indicates the intensity of the DPSK signal as a function of time and the hatching below the curve is representative of the signal phase, which may be 0 or π. Whenever there is a phase transition between subsequent bits, namely at 100, 200, 500 and 700 ps, the intensity drops to 0. A signal of this type may be generated using a Mach-Zehnder structure as a phase modulator at the emitter side. FIG. 3 is the corresponding intensity-modulated output signal at constructive port 8. It is 0 for each bit period in which the phase of the DPSK signal is different from that of the next bit, and it is 1 whenever the two phases are similar.

Figure 4:
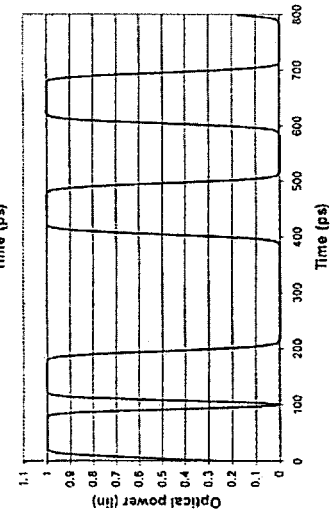
FIG. 4 illustrates an intensity modulated signal obtained at a destructive output port in case of perfect tuning.

FIG. 4 shows the corresponding output signal at destructive output port 9. It is the logical inverse of the signal at constructive port 9. Since the intensity of the original DPSK signal vanishes at every phase transition, the output signal of the destructive port drops to 0 between two consecutive bits of value 1, in contrast to the output signal of constructive port 8.

When the delays of the two arms 4, 5 are not exactly matched, e.g. due to a frequency drift of the optical carrier, interference is no longer perfectly destructive or perfectly constructive at the output ports 8, 9. The "1" will have a lower power, while the power of the "0" will no longer vanish. The result is a reduction of the eye opening, as is apparent from FIG. 5, 6 which show output intensities at constructive and destructive output ports 8, 9, respectively, in case of mismatch.

Since a loss of intensity for the "1" is accompanied by rise of intensity for the "0", the average power at the two ports 8, 9 is not noticeably different from that in case of perfect frequency matching. For other frequencies the situations different as can be seen from FIG. 7.

Figure 7:
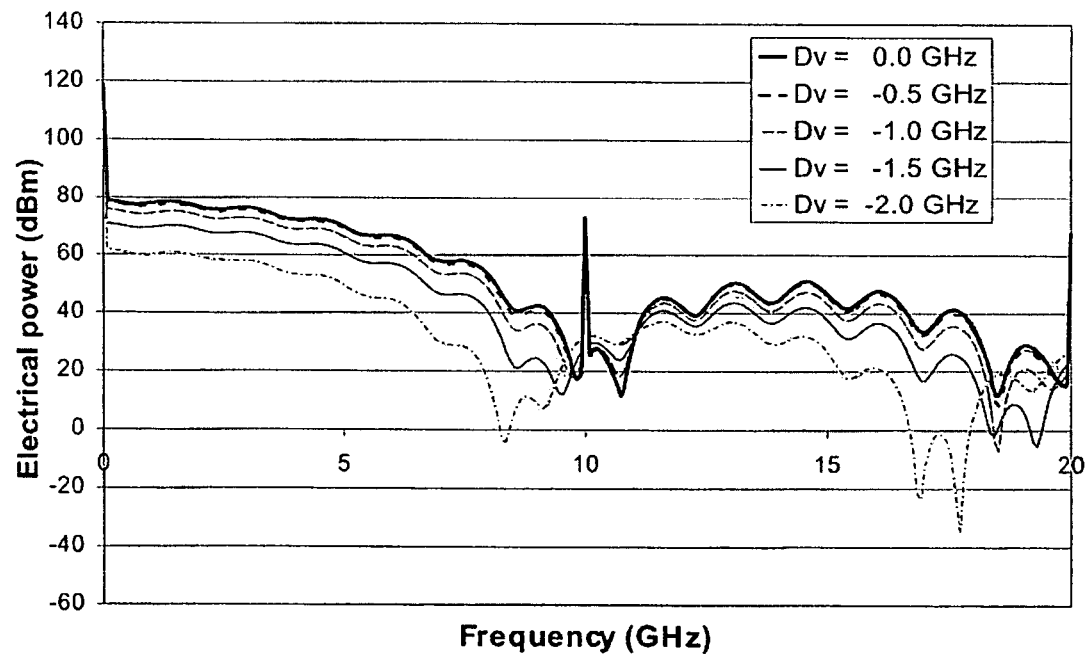
FIG. 7 illustrates power spectra obtained at the constructive output port for various values of frequency mismatch.
Figure 5:
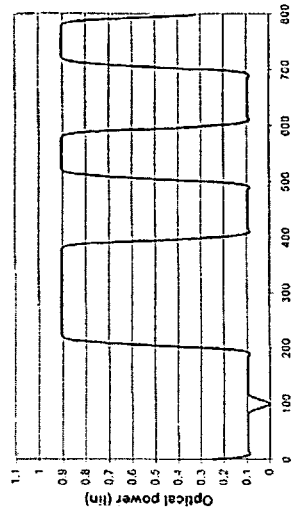
FIG. 5 illustrates the output signal at the constructive output port in case of non-perfect tuning.
Figure 6:
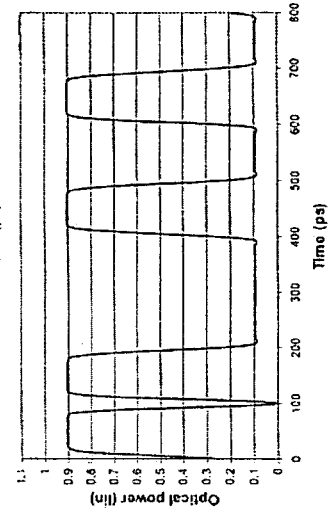
FIG. 6 illustrates the output signal at the destructive output port in case of non-perfect tuning.

FIG. 7 shows power spectra at the constructive output port 8 obtained for various values of frequency mismatch between the optical carrier and the interferometer 3 by a numerical simulation based on a 27-1 pseudo-random bit-sequent pattern. In the absence of frequency mismatch (Dv=0 GHz), the spectrum is typical of a NRZ pattern, with a dip around the bit frequency and two sharp peaks at zero frequency and at the bit frequency, 10 GHz. The two peaks do not depend strongly on the frequency mismatch, but in an intermediate frequency range, e.g. from approximately 0.1 to 9 GHz, a strong and monotonic decrease of the power with increasing frequency mismatch Dv is observed, from which it is seen, that by maximizing the electrical power in this frequency range, tuning of the interferometer to the carrier frequency can be achieved.

A similar dependence can be observed in a frequency range above the bit frequency, too, e.g. between approximately 11.5 and 17 GHz, so that power in this frequency range might serve as a tuning criterion for the interferometer 3, too. However, since a very fast optical sensor would be needed for observing this spectral range, a pass band between 0 and the bit frequency, e.g. from 1 to 8 GHz, is preferred.

Based on these findings, the operation of the assembly of FIG. 1 can now be fully understood: the variation or dithering of the heating power obtained by adding the output of local oscillator 15 to that of heater control circuit 16 makes the temperature of interferometer arm 5 and, hence, the frequency mismatch Dv between arms 4, 5 oscillate slightly.

This oscillation is reflected by a fluctuation of the power spectrum at the output of interferometer port 8, and, accordingly, the power signal provided by envelope detection circuit 13 to phase comparator 14 oscillates. The phase relationship between the output signals of envelope detection circuit 13 and local oscillator 15 indicates whether the mismatch in interferometer 3 is positive or negative, and accordingly, control circuit 16 will either increase or decrease its output level depending on whether the oscillating signals it receives from envelope detection circuit 13 and local oscillator 15 are in phase or in phase opposition. If the output level of envelope detection circuit 13 does not oscillate at the local oscillator frequency, the interferometer 3 is perfectly tuned to the optical carrier frequency, and the output level of heater control circuit 16 is constant.

Whenever the heating power of heater 7 is modified, there is a delay of a fraction of a second to some seconds, depending of the size of the interferometer and the relative positions of heater 7 and arm 5, until a change of the heating power has an effect on the phase matching of the two arms. In order to be effective, the period of the local oscillator 15 is made longer than this delay, i.e. its frequency is set to some Hz or even less than 1 Hz.

Of course, the concept of the invention as described above is not limited to the assembly of FIG. 1 or to a NRZ-DPSK signal as shown in FIG. 2. For example, instead of the single photodiode 10 shown in FIG. 1, two photodetectors might be provided, a fast one for providing a bit-resolved electrical signal to the data regeneration circuitry 11, and a second one which may be slower in response and which is connected to band pass filter 12 and which is supplied a small fraction of the intensity output by constructive port 8 by means of a tap inserted in the fibre between constructive port 8 and the fast photodetector.

Figure 8:
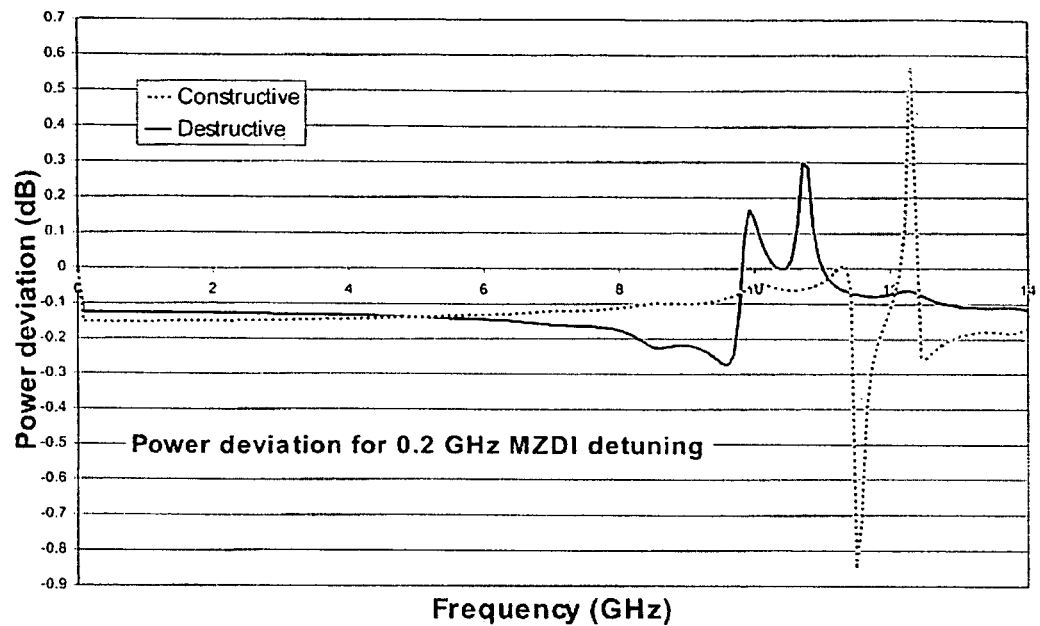
FIG. 8 illustrates the power deviation between perfect tuning and 0.2 GHz detuning as a function of frequency for a NRZ-DPSK signal.

As a further alternative, a single photodiode for supplying an electrical signal to the data regeneration circuitry 11 alone is connected to the constructive output port 8, and a second photodetector, which may be slower, is connected to the destructive output port 9. Since the signal at the destructive output port has a RZ-shape as shown in FIG. 3, the power spectrum is slightly different from that of constructive port 8; mainly, the dip is shifted to approximately 12 GHz, but the decrease of signal power in a frequency range between 0 and the bit frequency or between the bit frequency and its second harmonic is similar to what is shown in FIG. 7. for the constructive port 8. FIG. 8 shows the power deviation, i.e. the difference between the power with and without frequency mismatch, for a mismatch of 0.2 GHz, as a function of frequency, for constructive and destructive ports. The two curves are closely similar in a frequency range from 0.2 to 8 GHz.

Figure 9:
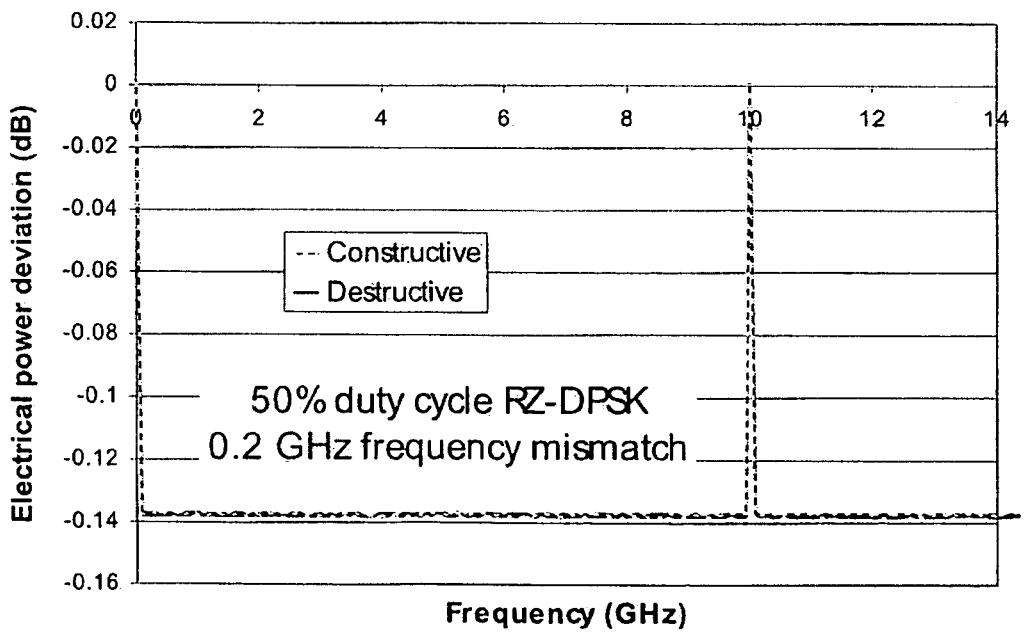
FIG. 9 illustrates the power deviation as function of frequency for a RZ-DPSK signal.

A further example of electrical deviation as a function of frequency for 0.2 GHz frequency mismatch is given in FIG. 9 for a 50% duty cycle RZ-DPSK signal. Between 0.2 and 9.8 GHz and above 10.2 GHz the power deviation varies only minimally as a function of frequency, and as should be expected for this type of signal, the deviations at constructive and destructive output ports are practically indistinguishable from one another.

The invention claimed is:

1. A demodulator for a DPSK-modulated optical signal of bit frequency 1/T, said demodulator comprising:
    an interferometric structure having an input port for receiving the DPSK-modulated optical signal, an output port, and first and second arms extending from said input port to said output port;
    adjustment means for fine tuning a propagation delay difference of said two arms in a range comprising T, the adjustment means comprising a phase comparator;
    an optical-electrical converter connected to the output port of the interferometric structure; and
    a bandpass filter connected to an output of the optical-electrical converter, the passband of which does not include 1/T,
    wherein the adjustment means is adapted to fine tune the propagation delay difference according to an output power level of the bandpass filter.

2. The demodulator of claim 1, wherein the interferometric structure is a Mach-Zehnder interferometer.

3. The demodulator of claim 1, wherein the passband has a lower cut-off frequency above 0 and an upper cut-off frequency below 1/T.

4. The demodulator of claim 1, wherein the adjustment means comprises a controllable optical element located in the second arm of the interferometric structure, the delay of which is variable according to a control signal supplied to the controllable optical element, and a control circuit for deriving the control signal from the output power level of the bandpass filter, and for transmitting the control signal to the controllable optical element.

5. The demodulator of claim 4, wherein the controllable optical element comprises a piece of a material, the index of refraction of which is variable with temperature, and a heater and/or cooler for heating or cooling said piece of material with a heating or cooling power based on the control signal.

6. The demodulator of claim 4, wherein the controllable optical element comprises a piece of a material, the index of refraction of which is variable with the strength of an electric or magnetic field applied to it, and field generating means for generating the field with a strength based on the control signal.

7. The demodulator of claim 5, wherein the control circuit comprises dithering means for dithering an amplitude of the control signal and for varying the average level of the control signal based on a phase relationship between the dithering amplitude of the control signal and a fluctuation of the output power level of the bandpass filter.

8. The demodulator of claim 7, wherein the heater is an ohmic heater, and the dithering amplitude of the control signal is inversely proportional to the average level of the control signal.

9. A demodulator for a DPSK-modulated optical signal of bit frequency 1/T, said demodulator comprising:
    an interferometric structure having an input port for receiving the DPSK-modulated optical signal, an output port, and first and second arms extending from said input port to said output port;
    an adjustment unit which fine tunes a propagation delay difference of said two arms in a range comprising T, the adjustment unit comprising a phase comparator;
    an optical-electrical converter connected to the output port of the interferometric structure; and
    a bandpass filter connected to an output of the optical-electrical converter, the passband of which does not include 1/T,
    wherein the adjustment unit is adapted to fine tune the propagation delay difference according to an output power level of the bandpass filter.

* * * * *